May 17, 1955  F. T. NEWELL ET AL  2,708,307

METHOD OF MAKING A SPLIT PIPE SLEEVE

Filed July 29, 1952  6 Sheets-Sheet 1

INVENTORS
FREDERICK T. NEWELL
BY AND ROGER E. RISLEY

ATTORNEY

May 17, 1955  F. T. NEWELL ET AL  2,708,307
METHOD OF MAKING A SPLIT PIPE SLEEVE
Filed July 29, 1952  6 Sheets-Sheet 3
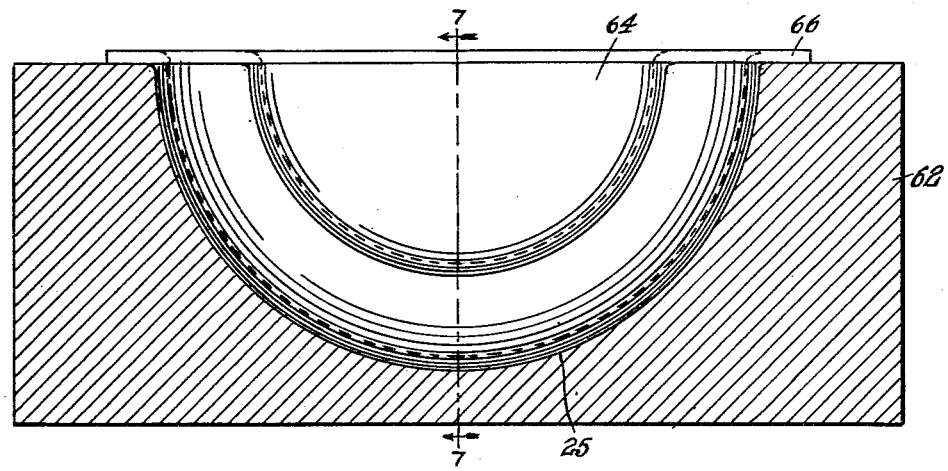
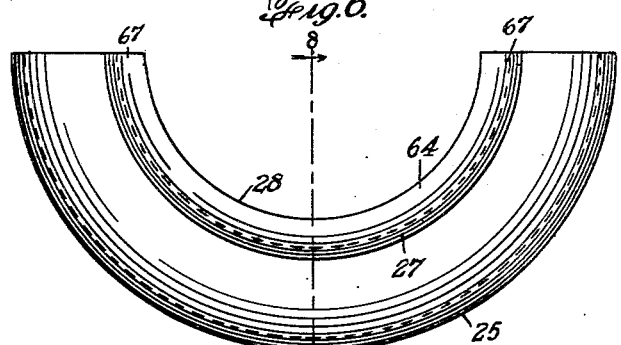
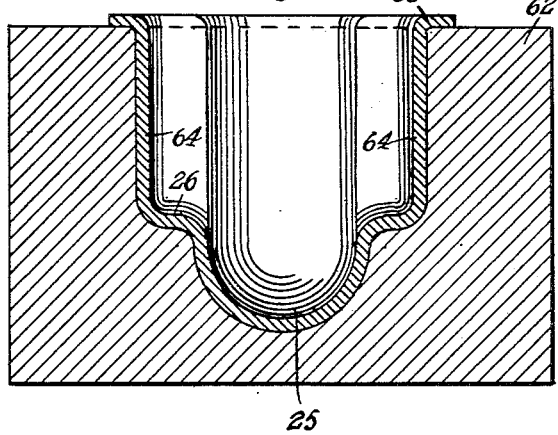
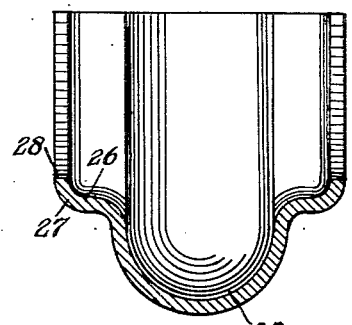
INVENTORS
FREDERICK T. NEWELL
AND ROGER E. RISLEY
BY
ATTORNEY.

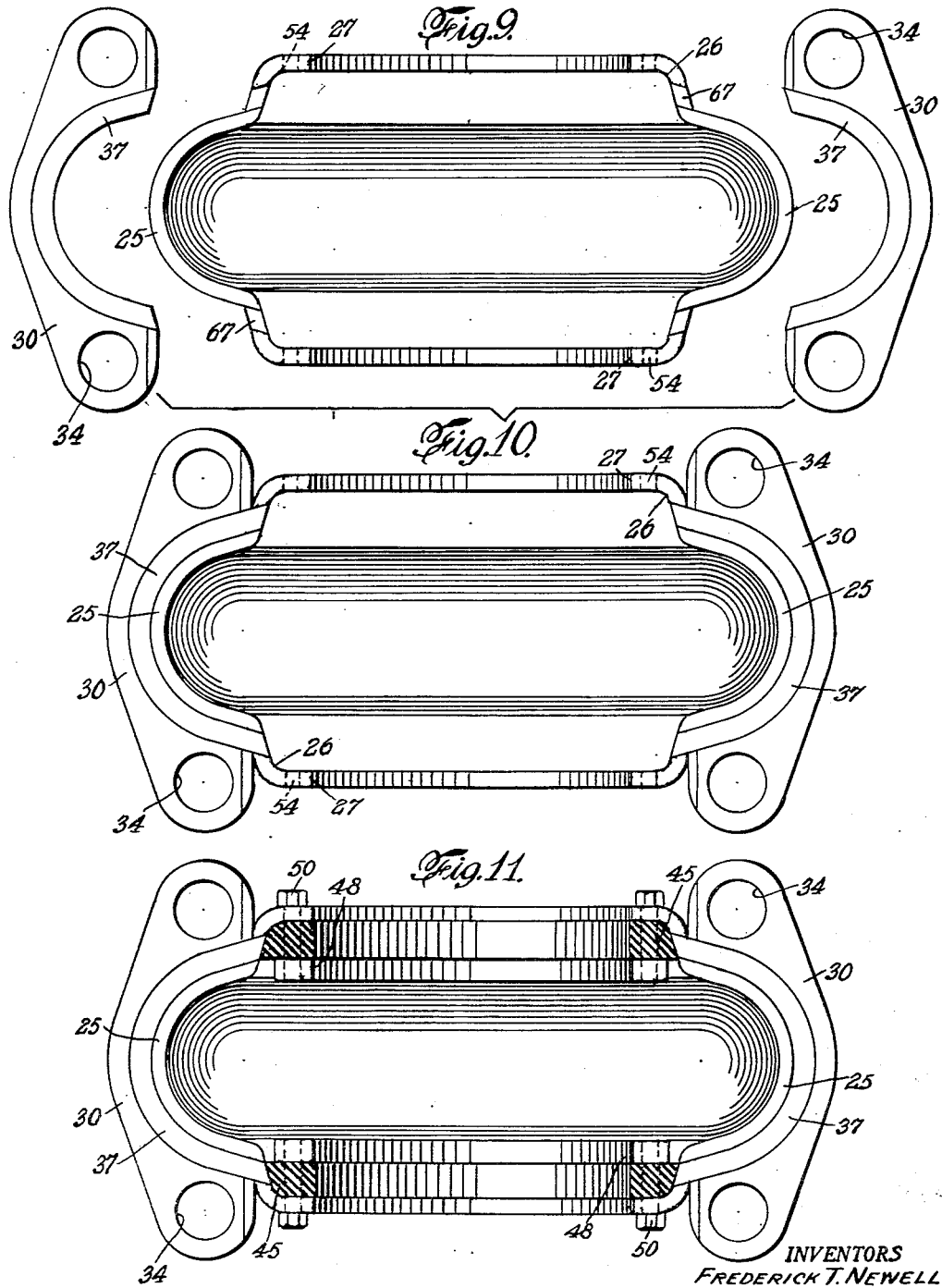

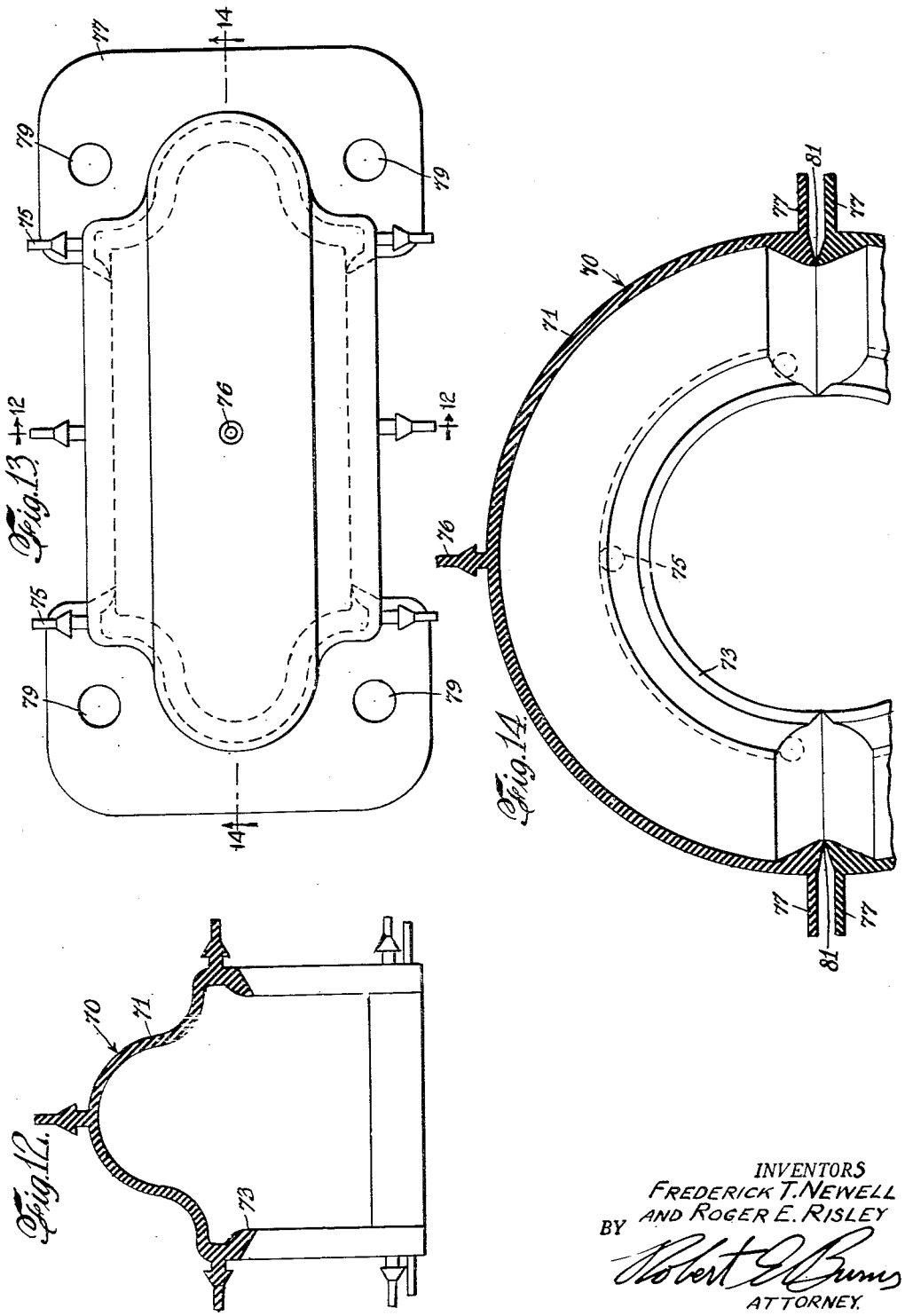

May 17, 1955     F. T. NEWELL ET AL     2,708,307
METHOD OF MAKING A SPLIT PIPE SLEEVE
Filed July 29, 1952     6 Sheets-Sheet 6
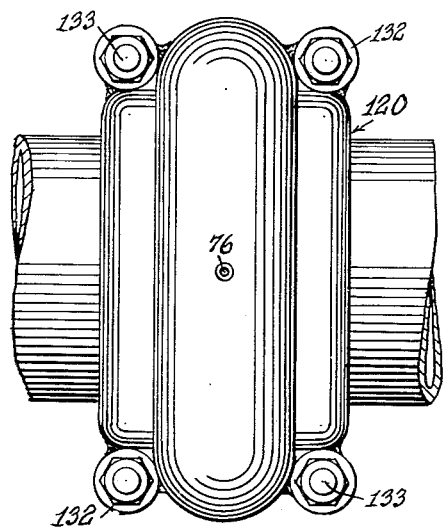
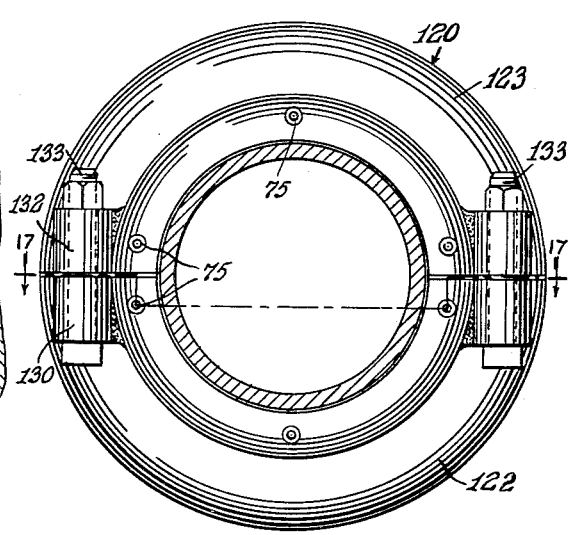
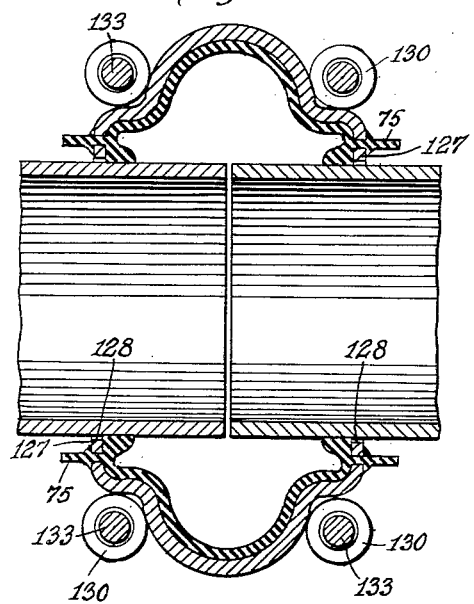
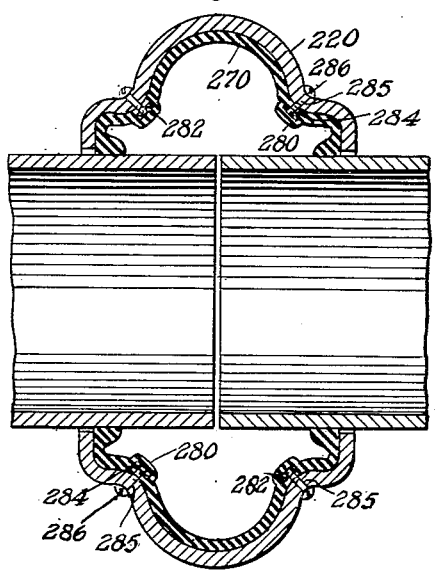
INVENTORS
FREDERICK T. NEWELL
AND ROGER E. RISLEY
BY
*Robert E. Burns*
ATTORNEY.

United States Patent Office 2,708,307
Patented May 17, 1955

2,708,307

METHOD OF MAKING A SPLIT PIPE SLEEVE

Frederick Thomas Newell and Roger E. Risley, Bradford, Pa., assignors to Dresser Industries, Inc., Dallas, Tex., a corporation of Pennsylvania Application July 29, 1952, Serial No. 301,466

3 Claims. (Cl. 29—463)

This invention relates to devices for enclosing a portion of a pipe line, and is more particularly concerned with split repair sleeves and compression couplings for use in the construction and repair of pipe lines.

Steel and iron pipe lines used for the transmission of oil, gas, water and like fluids, both above and below ground, are formed from aligned sections of pipe which are interconnected by compression couplings. These couplings generally comprise a tubular sleeve or "middle ring" and sealing gaskets, which are compressed into fluid-tight engagement with the sleeve and the external surface of the pipe sections being joined by means of followers drawn against the ends of the sleeve by bolts or similar means. Another type of coupling commonly used in pipe line construction has an internal sealing gasket which is pressed into fluid-tight engagement with the outer surface of the pipe by the pressure of the fluid being transmitted through the line.

After long periods of service, such pipe lines occasionally develop leaks at the joints between the various sections of pipe, or breaks or cracks occur in the body of the pipe sections themselves. Whenever possible, these leaks, breaks and cracks are repaired without taking the pipe line apart, since costly interruptions in service are thus avoided. For this purpose, there has been developed the so-called split repair sleeve which is intended to be clamped to the portion of the pipe line to the repaired to provide a flexible, yet fluid-tight, seal around the faulty section of the line. These split repair sleeves are generally made of cast or wrought metal and commonly comprise two segments provided with radial flanges, extending longitudinally of the segments, which are drawn together by means of side clamping bolts upon suitable packing material. The ends of the segments are brought into fluid-tight engagement with the outer surface of the pipe by means of suitable gaskets which are compressed radially against the pipe by means of clamping rings or followers. Since the split repair sleeves must be of sufficient size to enclose a coupling, in order that they may be employed to repair leaking couplings when necessary, they must provide a fluid-tight enclosure of substantial dimensions. The manufacture of such split repair sleeves from cast or wrought metal is relatively difficult and expensive. Similarly, in certain types of compression couplings of the character above indicated, it is often desired to provide an enclosure of substantial size and these couplings have generally heretofore been formed from cast or wrought metal with the corresponding disadvantages from the standpoint of manufacturing cost and difficulty. Various proposals have been made in the past which have been aimed at the provision of a structure which is as effective and as efficient as the cast and wrought metal structures but which is more easily manufactured at lower cost. These prior proposals, however, have not been entirely satisfactory for all purposes and have involved deficiencies and drawbacks of various nature.

It is a principal object of the present invention to provide a device of improved construction for enclosing a portion of a pipe line.

It is another object of the invention to provide a split repair sleeve of the character indicated which may be easily and rapidly manufactured.

It is a further object of the invention to provide a split repair sleeve and a pipe coupling which avoid the manufacturing disadvantages and drawbacks of cast and wrought metal repair sleeves and couplings which have been heretofore proposed.

It is a further object of the invention to provide a method of making pipe couplings and split repair sleeves which does not require the formation of castings.

It is another object of the invention to provide a method of the character indicated which permits rapid and economical manufacture of pipe couplings and split repair sleeves.

In accordance with the invention, there is provided a device for enclosing a portion of a pipe line, i. e. a pipe coupling, split repair sleeve and the like, which is formed from two deep drawn flat blanks which are subjected to drawing operations to form bowl-shaped sleeve halves and are then suitably cut and provided with flanges to form the device of the invention. The blanks employed are formed from steel, copper, aluminum or other malleable metal, but for most purposes steel is preferred because of its strength and relatively low cost and availability. In accordance with the method of the invention, the blanks are deep drawn to provide the desired bowl-shaped form with a continuous peripheral rim, the rim is then trimmed, pipe apertures are cut, bolt apertures are provided adjacent the pipe apertures for reception of follower bolts, and side clamping flanges are welded to the longitudinal edges of the sleeve half between the pipe apertures.

It is a feature of the invention that a device for enclosing a portion of a pipe line may be rapidly and economically produced, without resort to castings, by a sequence of relatively few steps.

It is another feature of the invention that the pipe enclosing device is adapted to be used with compression gaskets or with gaskets of the self-sealing type to provide a fluid-tight enclosure for a pipe line, either at the juncture between two sections of the pipe or at any other portion of the pipe line.

Other objects and features of the invention will be readily apparent from the following detailed description thereof and from the accompanying drawings, wherein:

Fig. 5 is a side elevational view of the arrangement shown in Fig. 4, illustrating the form of the rough sleeve half;

Fig. 6 is a similar view of the rough sleeve half after it has been trimmed and the pipe aperture cut in it;

Fig. 7 is a sectional view taken substantially along the line 7—7 of Fig. 5;

Fig. 8 is a sectional view taken approximately along the line 8—8 of Fig. 6;

Fig. 9 is a top plan view of the sleeve half shown in Fig. 8, illustrating the side bars being moved into position for welding to the edges of the sleeve half;

Fig. 10 shows the arrangement of Fig 9 in a further stage of assembly in which the side bars have been welded into position;

Fig. 11 shows the completed sleeve half;

Fig. 12 is an axial sectional view, taken approximately along the line 12—12 of Fig. 13, of a self-sealing gasket and illustrating one means of securing the gasket to the sleeve in which it is positioned;

Fig. 13 is a top plan view of the gasket shown in Fig. 12;

Fig. 14 is a radial sectional view taken approximately along the line 14—14 of Fig. 13;

Fig. 15 is a side elevational view of a modified form of a split sleeve constructed in accordance with the method of the invention;

Fig. 16 is an end elevational view of the sleeve shown in Fig. 15;

Fig. 17 is a longitudinal sectional view taken approximately along the line 17—17 of Fig. 16; and Fig. 18 is a longitudinal sectional view of a modified form of the split sleeve shown in Fig. 2, illustrating the use of a self-sealing gasket with nut and bolt securing means.

Figure 2:
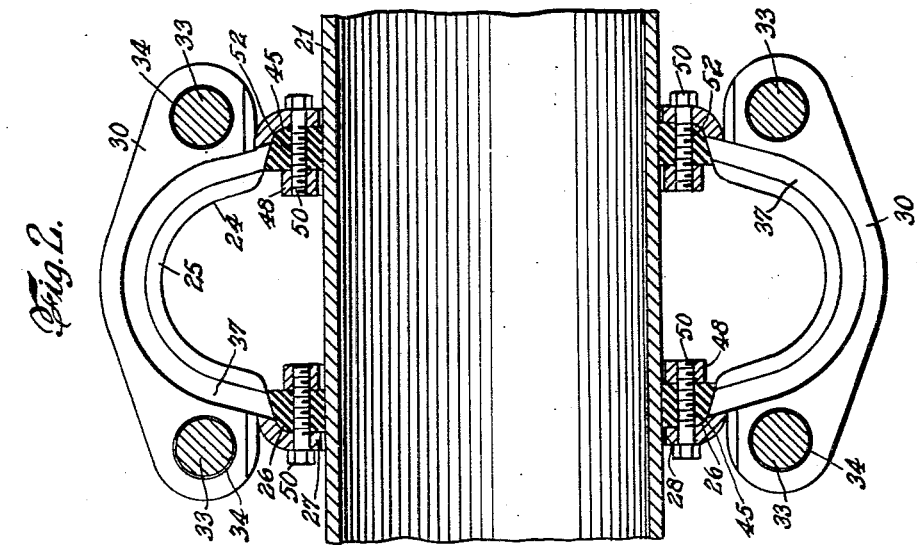
Fig. 2 is a longitudinal sectional view taken approximately along the line 2—2 of Fig. 1.
Figure 1:
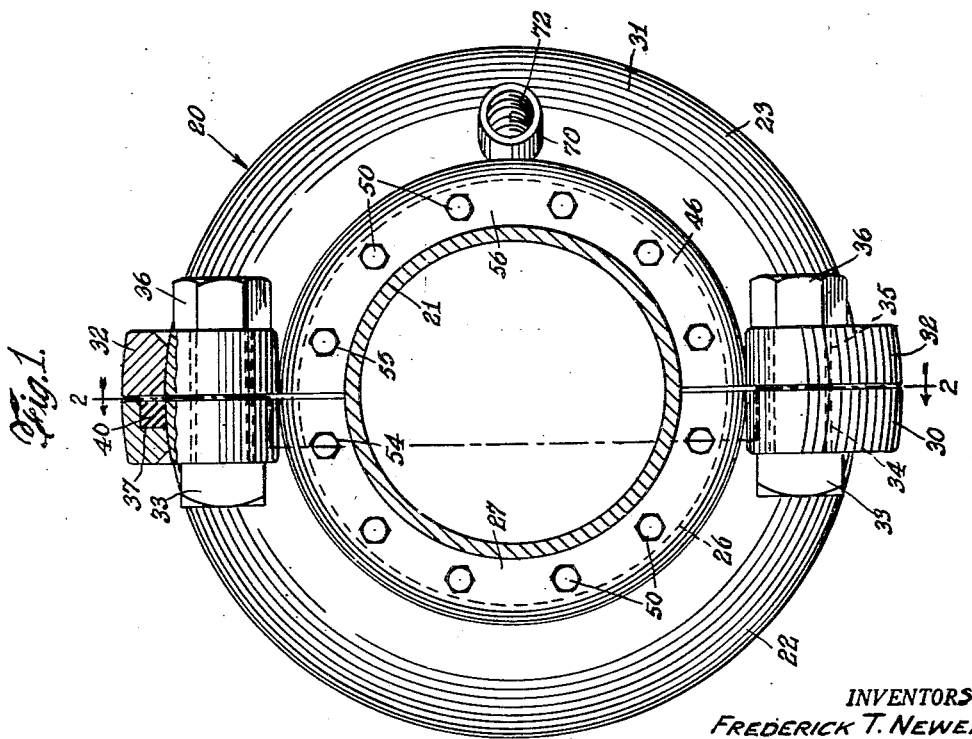
Fig. 1 is an end elevational view partly in section to show details of structure of a split sleeve embodying features of the present invention.

Referring to the drawings, and more particularly to Figs. 1 and 2, the reference numeral 20 designates generally a split pipe sleeve constructed in accordance with the present invention. The sleeve 20, which is shown in position on a pipe 21, is formed from two complementary sleeve segments or halves 22 and 23 which are connected along an axial juncture line to provide the completed sleeve 20 which forms a tubular enclosure for the portion of the pipe line around which it is positioned. As shown in Fig. 2, the sleeve segment 22 comprises a semi-tubular body portion 24 which has a radially-elongated central section 25 and curves axially outwardly adjacent pipe 21 to define gasket recesses 26 and has radially inwardly directed flange portions 27 which define pipe apertures 28 through which the pipe 21 extends. The longitudinal edges of sleeve body portion 24, at the radial juncture line between the two sleeve segments, are provided with side bars or radial flanges 30 which are secured, as by welding, to the outer surface of the body portion 24. The sleeve segment 23 has a body portion 31 of a size and form substantially identical with body portion 24 of sleeve segment 22 and is provided with side bars 32 of the size and general outline of side bars 30.

The sleeve segments 22 and 23 are interconnected around the pipe 21 by means of bolts 33 which pass through aligned apertures 34 and 35 in the side bars 30 and 32, respectively, and are drawn up by means of nuts 36.

Since the split sleeve 20 is intended to enclose a leaking portion of a pipe line to prevent further leakage or is adapted to be used as a coupling to connect the opposed ends of two sections of the pipe line in fluid-tight, pressure-resistant relationship, it is apparent that the sleeve must form a gas- and liquid-tight enclosure for the portion of the pipe line about which it is positioned. To insure the desired fluid-tightness of the sleeve, there are provided suitable gasket means both between the side bars 30 and 32 of the two sleeve segments and at the axial ends of the sleeve adjacent the pipe apertures 28 through which the pipe 21 axially extends. As shown in Figs. 1 and 2, the faces of the side bars 30 and the adjacent areas of the body portion 24 are formed with gasket or side pack grooves 37 which extend between the two gasket recesses 26 at each end of the sleeve segment. As seen in Fig. 2, the side pack grooves 37 follow the external curvature of the body portion 24 and have their inner edges abutting this element. Seated in the grooves 37 are side bar strips or gaskets 40 which are adapted to be radially expanded into sealing engagement with the opposed faces of the side bars 30 and 32 of the two sleeve segments 22 when the two sleeve segments are drawn together by means of the bolts 33 and the cooperating nuts 36. The positions of the bolt apertures 34 and 35 are such that sufficient pressure is applied to the side bar gaskets 40 when the bolts are drawn up to provide an effective fluid-tight and pressure-resistant seal along the juncture line between the two sleeve segments 22 and 23.

The side bar gaskets 40 are formed from rubber or rubber composition, this term being used generally to include natural and synthetic rubbers and elastomeric compounds or compositions having like properties and characteristics. The material is relatively firm and solid but sufficiently resilient and elastic to flow under pressure to conform to the surfaces between which it is confined.

The end flange portions of the split sleeve 20 adjacent the pipe 21 are similarly effectively sealed against escape of fluid from within the sleeve even when the fluid is under pressure. For this purpose, end gaskets 45 are positioned in the gasket recesses 26 and 46 of body portions 24 and 31, respectively. These end gaskets 45 are advantageously semi-circular in form with abutting ends and are suitably formed from the same type of material as that from which the side bar gaskets 40 are formed, viz., a rubbery material which is relatively firm and solid but sufficiently resilient and elastic to flow under pressure to conform to the surfaces between which it is confined. The end gaskets 45 are expanded radially into fluid-tight engagement with the walls of the gasket recesses 26 and 46 and with the outer surface of pipe 21 by means of followers 48. The followers 48 are drawn axially outwardly against the gaskets 45 by means of follower bolts 50 which are threadedly engageable with the followers 48 and which pass through circumferentially-spaced apertures 52 in the gaskets 45 which are aligned with apertures 54 and 55 in the flange portions 27 and 56 of the sleeve segments 22 and 23, respectively. When the follower bolts 50 are tightened, the followers 48 are drawn toward the flange portions 27 and 56 and axially compress the gaskets 45, thereby radially expanding the gaskets into fluid-tight sealing engagement with the adjacent surfaces of the pipe 21 and the sleeve 20. The followers 50 are advantageously semi-circular in form and have abutting ends and thus conform generally to the form of the gaskets 45.

In accordance with the invention, the split sleeve 20 is rapidly and efficiently formed by deep drawing two malleable metal blanks which are then suitably cut and furnished with welded side bars to form the sleeve segments 22. The materials and the steps employed in forming the above-described sleeve 20 in accordance with the method of the invention are shown in Figs. 3 to 11. In these figures of the drawings, the sequential steps in the manufacture of one of the sleeve segments 22 are illustrated and the following description will, for purposes of clarity, be directed to the manufacture of the sleeve segments 22. It will be apparent, however, that sleeve segment 23, which is substantially identical in structure, is formed in the same manner.

Figure 3:
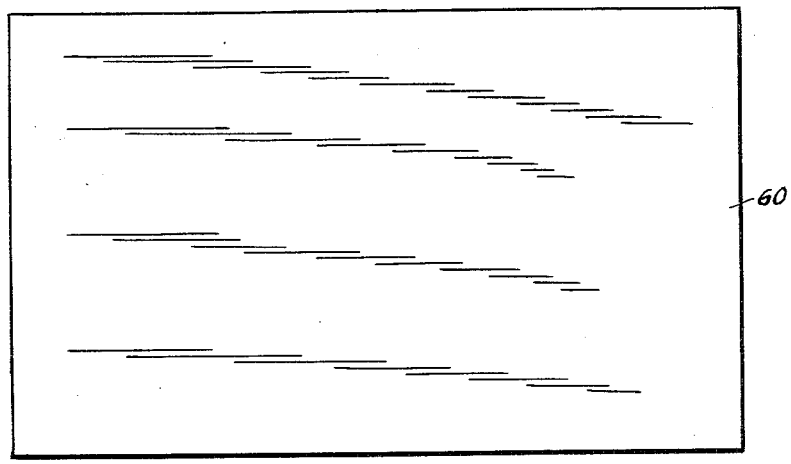
Fig. 3 is a diagrammatic plan view of a blank from which a longitudinal half of the sleeve shown in Figs. 1 and 2 is formed.
Figure 4:
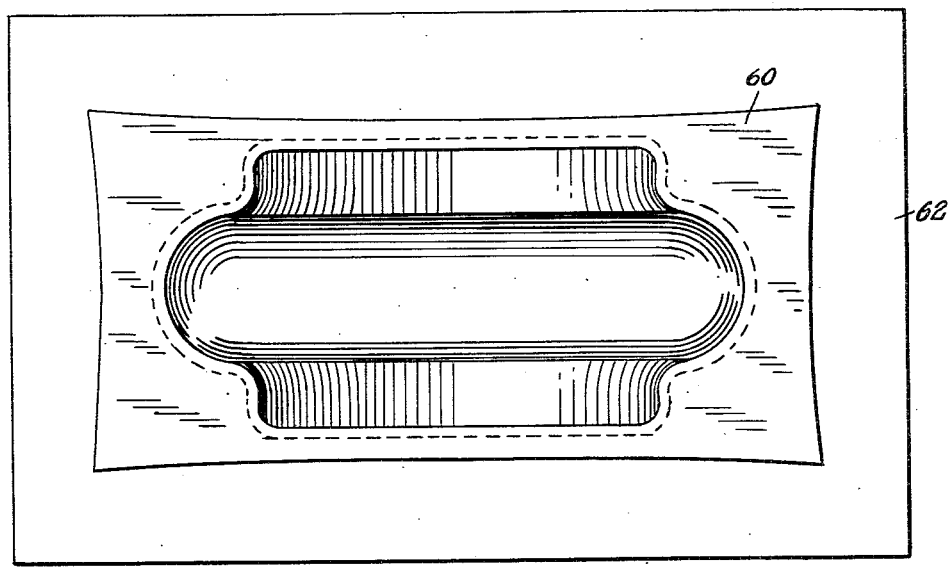
Fig. 4 is a diagrammatic plan view of the blank of Fig. 3 after it has been deep drawn in a die.

Referring more particularly to Figs. 3 and 4, the reference numeral 60 designates the blank from which the sleeve segment 22 is formed by a deep drawing operation. The blank 60 illustrated is rectangular in outline but this particular outline is not essential and the blank may have any polygonal or other outline as long as it is of a shape which will provide for the formation of the sleeve segment and allow a sufficient margin for adequate clamping and securing of the blank during the drawing operation. The blank 60 is placed in the die 62, clamped along its marginal edges by any convenient means (not shown) and drawn into the form of the die recess by known deep drawing operations, as indicated generally in Fig. 4 either in a single step or in a plurality of steps. The particular appearance of the marginal portions of the blank 60 as viewed in Fig. 4 will vary but the specific shape of the marginal portions overlying the top of the die is not important from the standpoint of the invention. In accordance with the invention the blank 60 is thus converted into a rough sleeve segment having the shape shown in Figs. 4, 5 and 7 which show the shaped blank in the die 62 following the drawing operations and just before removal. It will be observed that the rough sleeve segment has the central radially-elongated section 25, curving axially-outwardly at its ends and the sides of each end are connected by a continuous web 64. The entire edge of the rough sleeve segment has a peripheral flange 66 which comprises the portion of the blank 60 which was not drawn into the die recess. The rough sleeve segment is withdrawn from the die in this form and is ready for the remaining manufacturing operations of the process of the invention.

Following the drawing operations just described, the flange 66 is cut off and the sleeve segment trimmed to a finished longitudinal edge, and an arcuate segment is cut from each of the webs 64 to provide the pipe apertures 28 and to define the flange portions 27 adjacent thereto. The extensions 67 of the side bar grooves are cut in the edges of body portion 24 adjacent the gasket recesses 26. The sleeve segment 22 in its now partially completed state has the form shown in Figs. 6 and 8. The flange portions 27 are now provided with the follower bolt apertures 54 and the side bars 30, previously provided with bolt apertures 34 and side pack grooves 37, are brought into position along the longitudinal edges of the sleeve segment 22 and welded thereto, as shown in Figs. 9 and 10. The gaskets 45 and followers 48 are then installed in the body portion 24 by means of the follower bolts 50 and the completed sleeve segment 22 is ready for use. As previously mentioned, the complementary sleeve segment 23 is manufactured in like manner, differing from the segment 22 essentially only in that the side bars 32 do not have side pack grooves corresponding to the grooves 37. If desired, however, such grooves could be provided in the side bars 32 for reception of a portion of the side bar strips 40 which, in this case, would be of increased thickness to provide sufficient material to extend into the grooves in the opposed side bars and to form a central portion to be compressed between the side bars upon tightening of the bolts 33.

To install the sleeve 20 about any portion of a pipe line it is merely necessary to position the sleeve segments 22 and 23 around the pipe portion and then to draw up the side bar bolts 33 and the follower bolts 50. When the sleeve 20 is employed as a pipe coupling rather than being used to repair a damaged portion of an existing pipe line, the two segments may first be loosely joined by the bolts 33 so that the complete sleeve can be simultaneously slipped over the pipe ends.

In many cases, particularly when the sleeve 20 is used as a pipe repair device, it is desirable to vent the sleeve or to provide means for drawing off a side stream from the sleeve. For this purpose there is suitably provided, as shown in Fig. 2, a closable vent 70 formed by an internally-threaded tubular element welded to the exterior surface of body portion 31 and communicating with an aperture 72 formed in the wall of the body portion. A removable plug or other closure means (not shown) serves to close the vent 70.

It will thus be seen that, in accordance with the invention, a split sleeve for use on pipe lines may be easily formed from steel or other malleable metal and that the need for making special castings and other complicated and expensive manufacturing procedures are eliminated. A more rugged sleeve is provided by the process of the invention and the time and manpower required for its manufacture is materially reduced.

It will be apparent that the above-described process may be varied in numerous respects without departing from the scope of the invention and that split sleeves of modified structure may be thereby provided. For example, instead of forming the sleeve for the reception of separate side packs and end gaskets which provide the desired fluid-tightness, when they are compressed by drawing up the side bar bolts 33 and the follower bolts 50, fluid-tightness of the sleeve may be achieved by means of a so-called "self-sealing" gasket, suitably shaped and constructed to fit the sleeve segments. A self-sealing gasket suitable for use with the above-described sleeve 20 when modified to a relatively small extent is shown in Figs. 12, 13 and 14.

As shown in the drawings, the self-sealing gasket illustrated is formed from two semi-circular halves 70 which are shaped to conform to the interior surface of each split sleeve segment. The gasket halves 70, like the gaskets employed in the above-described embodiments, are formed from rubber or rubber composition, or like deformable elastic material. As shown in Fig. 12, the gasket half 70 is channel-shaped and the lateral ends of the walls 71 of the gasket half are formed with inwardly-extending annular pipe-engaging lips 73 which are adapted to be pressed sealingly against the outer surface of the pipe around which the gasket is positioned by the pressure of the fluid passing through the pipe and flowing into the interior of the gasket.

The gasket halves 70 are secured to the sleeve segments by any convenient securing means. In the embodiment shown in Figs. 12—14, the gasket halves are formed with integral pull tabs 75 and 76 which pass through suitable apertures provided in the walls of the sleeve segments, for example, the apertures used for receiving the follower bolts when annular end gaskets 45 of the type shown in Fig. 2 are used. Alternatively the sleeve segments may be formed with apertures solely intended for reception of the pull tabs.

In order to seal the gasket halves at their longitudinal meeting ends and thus to provide a fluid-tight enclosure within the split sleeve, these ends are provided with radially outwardly-extending ears 77 adapted to extend between the side bars of the split sleeve and formed with apertures 79 to accommodate the side bar bolts. The longitudinal meeting ends are also provided with lips 81 and adjacent these lips the ends are formed with a thickened portion which reinforces the gasket and serves the important purpose of urging the lips of the cooperating gasket halves against each other to apply initial sealing pressure. The pressure of the fluid in the gasket when the sleeve is in service also, of course, exerts a force which presses the lips together.

Only minor changes in the structure of sleeve 20 need be made to accommodate fully the gasket halves 70. For example, an aperture to receive the pull tab 76 is bored in the central section of each sleeve segment and the side pack grooves 37 are advantageously eliminated from the side bars 30. The pull tabs 75 are inserted through some of the follower bolt apertures 54 and 55 in the flange portions of segments 22 and 23.

While the gasket halves 70 may be positioned in split sleeve segments of the form above-described and in which the followers and the annular gaskets have been removed, the self-sealing gasket halves are also advantageously used with a split sleeve embodying the structural features of the invention but which has a structure differing in some respects from that of the sleeve shown in Figs. 1 and 2. Referring, for example, to Figs. 15, 16 and 17, wherein parts corresponding to those shown in Figs. 1 and 2 have been given the same reference numerals to which 100 has been added, the sleeve 120 is formed from two semi-cylindrical sleeve segments 122 and 123. The ends of the sleeve 120 are formed by inwardly-directed flange portions 127 defining pipe apertures 128 and provided with apertures for receiving the pull tabs 75 of the gasket halves 70. Instead of side bars of the structure shown in Fig. 2, sleeve 120 has welded to its outer surface bolt-holding cylindrical members 130 and 132. In view of the self-sealing nature of the gasket used with sleeve 120 it is not necessary to provide side bars with grooves for receiving the side bar gasket. The bolts 133, passing through the apertures in the cylindrical members 130 and 132, hold the sleeve segments together and bring the edges of the sleeve segments into firm engagement with the surfaces of the ears 77 of the gasket halves 70. The gasket halves 70 are mounted in the sleeve segments by passing the pull tabs 75 and 76 through the apertures in the sleeve formed for this purpose.

The pull tabs 75 are one convenient means for securing the gasket halves in the sleeve segments. Other securing means, such as shown in section in Fig. 18, may be employed. In this figure there is shown a gasket 270 which is secured to the sleeve 220 with which it is associated by a screw and nut arrangement. The gasket 270 is formed with enlargements or bosses 280 which are molded at spaced-apart points in the gasket. Nuts 282 are molded into the bosses 280 during manufacture of the gasket, the mold being suitably provided with removable pins which extend from the exterior of the gasket into the apertures of the nuts. When the pins are removed, openings 284 remain and provide access to the nuts. The sleeve is provided with apertures 285 in alignment with the openings 284 and screws 286 are inserted through the apertures 285 and the openings 284 into threaded engagement with the nuts 282. This arrangement effectively secures the gasket 270 in the sleeve without providing an opportunity for leakage of fluid from the interior enclosure defined by the gasket. Alternatively, the gasket may be secured in the sleeve by adhesive means or the like.

The sleeve 220 shown in Fig. 18 is similar in structure to sleeve 20 of Figs. 1 and 2 and is made by the above-described process involving the deep-drawing of a malleable metal blank but is modified in a few respects to accommodate the gasket 270. Thus, the follower bolt apertures 54 and 55 are advantageously eliminated and in their place are provided the above-mentioned apertures 285 for reception of the gasket-holding screws 286. The sleeve 220 may be formed either with the side bar construction of sleeve 20 or with the cylindrical members of the embodiment of Figs. 15 to 17.

It will be obvious that various other changes and modifications may be made without departing from the scope of the invention as defined in the appended claims and it is intended, therefore, that all matter contained in the foregoing description and in the drawings shall be interpreted as illustrative and not in a limiting sense.

What we claim and desire to secure by Letters Patent is:

1. In a method of making a split sleeve for a pipe line, said sleeve being divided circumferentially into a plurality of arcuate segments and having axially spaced pipe-receiving apertures at its ends and an intermediate annular portion of substantially greater diameter than said apertures, the steps of providing a flat ductile metallic blank, subjecting said blank to a deep drawing operation to form said blank into one of said arcuate segments, said segment being arcuate in cross section with its center coinciding with the axis of the split sleeve to be produced and its radius equal to the radius of said sleeve and being U-shaped in axial section with opposite leg portions constituting end portions of said segment and a curved peripheral portion joining said legs, trimming said segment to provide in said end portions aligned arcuate pipe-receiving openings concentric with the axis of said sleeve, the edges of said segment other than said openings being substantially in an axial plane, securing apertured bolt-receiving projections on opposite sides of said segment substantially flush with said edges, and proceeding to form a plurality of like segments in like manner, a plurality of said segments being secured together by bolts passing through aligned openings in said projections to produce a complete sleeve.

2. A method of making a split sleeve for a pipe line, said sleeve having axially spaced pipe-receiving apertures at its ends and an intermediate annular portion of substantially greater diameter than said apertures, which comprises providing a flat ductile metallic blank, subjecting said blank to a deep drawing operation to form said blank into a semi-annular sleeve segment that in cross section is semi-circular with its center substantially coinciding with the axis of the split sleeve to be produced and in axial section is substantially U-shaped with spaced approximately radial web portions at opposite ends of said segment, trimming said segment to provide in said web portions aligned semi-circular pipe-receiving openings concentric with the axis of said sleeve, the edges of said segment other than said openings lying substantially in an axial plane, securing apertured bolt-receiving projections on opposite sides of said segment substantially flush with said edges, and forming a like segment in like manner, said segments being secured together by bolts passing through said apertured projections to produce a complete sleeve.

3. A method of making a split sleeve for a pipe line, said sleeve having axially spaced pipe-receiving apertures at its ends and an intermediate annular portion of substantially greater diameter than said apertures, which comprises providing a flat ductile blank, subjecting said blank to a deep drawing operation to form from said blank a semi-annular sleeve segment that in cross section is semi-circular with its center substantially coinciding with the axis of the split sleeve to be produced and in axial section is substantially U-shaped with opposite leg portions and a curved peripheral portion joining said legs, said legs extending inwardly from said peripheral portion toward the axis of said segment, then jogging axially outwardly away from one another and extending again inwardly toward said axis to form end portions of said segment with a semi-circular shoulder formed by said jog, trimming said section to provide in said end portions radially inwardly of said shoulders aligned semi-circular pipe-receiving openings concentric with the axis of said sleeve, the edges of said segment other than said openings lying substantially in an axial plane, securing apertured bolt-receiving projections on opposite sides of said segment substantially flush with said edges, and forming a like segment in like manner, said segments being secured together by bolts passing through said apertured projections to produce a complete sleeve.

References Cited in the file of this patent

UNITED STATES PATENTS

| | | |
|---|---|---|
| 811,631 | Graham | Feb. 6, 1906 |
| 867,628 | Williamson | Oct. 8, 1907 |
| 1,252,888 | Dorsey | Jan. 8, 1918 |
| 1,597,463 | Haughton | Aug. 24, 1926 |
| 1,677,264 | Barney | July 17, 1928 |
| 1,823,009 | Toaz | Sept. 15, 1931 |
| 1,906,782 | Zapf | May 2, 1933 |
| 1,911,126 | Pfefferle | May 23, 1933 |
| 2,209,403 | Kittner | July 30, 1940 |
| 2,321,085 | Hubbard | June 18, 1943 |
| 2,353,466 | Heintz | July 11, 1944 |
| 2,573,530 | Zallea | Oct. 30, 1951 |